(12) United States Patent
Chatroux et al.

(10) Patent No.: US 9,130,405 B2
(45) Date of Patent: Sep. 8, 2015

(54) SECURE BATTERY ELEMENT

(75) Inventors: Daniel Chatroux, Teche (FR); Jeremy Dupont, Bourgoin-Jallieu (FR); Sebastien Carcouet, Vif (FR)

(73) Assignee: Commissariat a l'energie atomique et aux energies alternatives, Paris (FR)

( * ) Notice: Subject to any disclaimer, the term of this patent is extended or adjusted under 35 U.S.C. 154(b) by 0 days.

(21) Appl. No.: 14/126,987

(22) PCT Filed: Jun. 12, 2012

(86) PCT No.: PCT/EP2012/061116
§ 371 (c)(1),
(2), (4) Date: Dec. 17, 2013

(87) PCT Pub. No.: WO2012/171917
PCT Pub. Date: Dec. 20, 2012

(65) Prior Publication Data
US 2014/0167655 A1 Jun. 19, 2014

(30) Foreign Application Priority Data
Jun. 17, 2011 (FR) ...................... 11 55349

(51) Int. Cl.
*H02J 7/36* (2006.01)
*H01M 2/20* (2006.01)
*B60L 3/00* (2006.01)
*B60L 3/04* (2006.01)
*B60L 11/18* (2006.01)

(52) U.S. Cl.
CPC .................. *H02J 7/36* (2013.01); *B60L 3/0046* (2013.01); *B60L 3/04* (2013.01); *B60L 11/1855* (2013.01); *H01M 2/206* (2013.01); *B60L 2240/547* (2013.01); *Y02T 10/7005* (2013.01); *Y02T 10/705* (2013.01); *Y02T 10/7011* (2013.01); *Y10T 307/76* (2015.04)

(58) Field of Classification Search
CPC ........... H02J 7/36; H02J 7/0031; H02J 9/061; Y02T 10/7011; Y02T 10/7005
USPC ....................... 307/85, 115; 320/134; 318/139
See application file for complete search history.

(56) References Cited

U.S. PATENT DOCUMENTS

| 6,046,575 A * | 4/2000 | Demuro ..................... 320/134 |
| 2009/0206679 A1* | 8/2009 | King et al. ..................... 307/125 |

(Continued)

FOREIGN PATENT DOCUMENTS

| DE | 102008010971 | 8/2009 |
| EP | 2284941 | 2/2011 |

(Continued)

*Primary Examiner* — Jared Fureman
*Assistant Examiner* — Alfonso Perez Borroto
(74) *Attorney, Agent, or Firm* — Occhiuti & Rohlicek LLP

(57) ABSTRACT

A battery element includes series-connected electrochemical accumulators applying a difference in potential between first and second poles, two power output terminals, and a securing device. The securing device comprises first and second switches connected in series between the first and second poles. The first switch is a normally-closed switch, and the second switch is a normally-open switch. The normally-open second switch is configured to selectively isolate/connect the first pole and the first terminal, and the normally-closed first switch being configured to selectively isolate/connect the first and second terminals. The electrochemical accumulators are configured to apply a voltage as a control signal for the normally closed first switch.

16 Claims, 6 Drawing Sheets

(56) References Cited

U.S. PATENT DOCUMENTS

2010/0109437 A1 5/2010 Fattic
2010/0116570 A1 5/2010 Sugawara et al.

FOREIGN PATENT DOCUMENTS

| JP | 2008206288 | 9/2008 |
| WO | 2008066253 | 6/2008 |

* cited by examiner

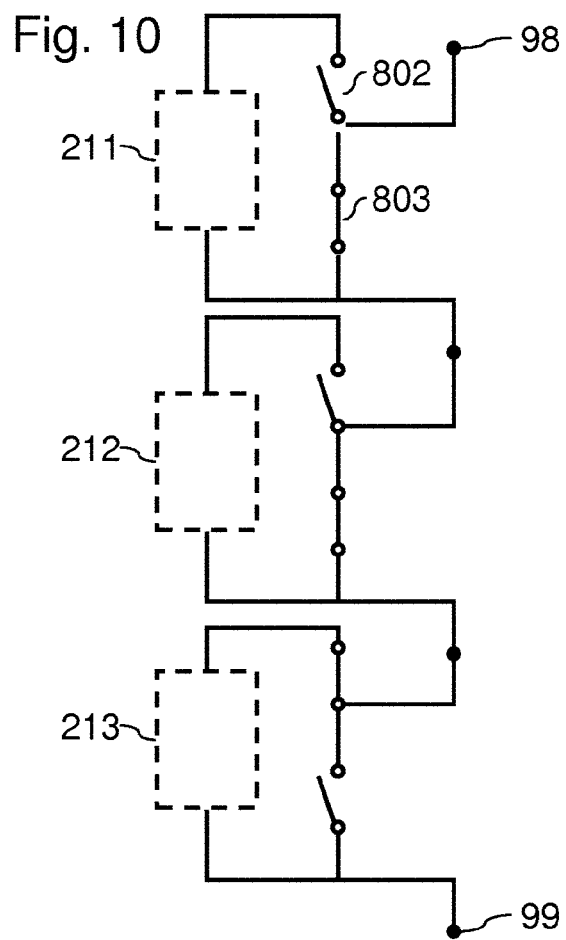

SECURE BATTERY ELEMENT

RELATED APPLICATIONS

This application is the national stage entry under 35 USC 371 of PCT/EP2012/061116 filed on Jun. 12, 2012, which claims the benefit of the priority date of French application FR 1155349, filed on Jun. 17, 2011, the content of which is herein incorporated by reference.

FIELD OF INVENTION

The invention pertains to batteries of electrochemical accumulators. These batteries can be used, for example, in the field of electric and hybrid transportation or that of embedded systems.

BACKGROUND

An electrochemical accumulator usually has a nominal voltage of the following orders of magnitude:
- 1.2 V for NiMH type batteries,
- 3.3 V for lithium-ion iron phosphate or LiFePO4, technology,
- 4.2 V for cobalt-oxide-based lithium ion type technology.

These nominal voltages are too low for the requirements of most systems that are to be powered. To obtain the appropriate level of voltage, several accumulators are placed in series. To obtain high values of power and capacitance, several accumulators are placed in parallel. The number of stages (number of accumulators in series) and the number of accumulators in parallel in each stage varies according to the voltage, the current and the capacitance desired for the battery. The association of several accumulators is called a "battery of accumulators."

Such batteries are used, for example, in vehicles to drive an alternating-current electric motor by means of an inverter. Such batteries also have a high capacity in order to favor the autonomy of the vehicle in electric mode. Typically, an electric vehicle uses a battery of accumulators, the nominal voltage of which is on the order of 400V, with a peak current of 200 A and a capacitance of 20 kWh.

Because of their high energy density, lithium-ion electrochemical accumulators are often used for such vehicles. The lithium-ion iron phosphate (LiFePO4) type battery technologies are undergoing major developments because of the intrinsically high level of security. This is achieved to the detriment of density of energy storage, which is somewhat lagging.

It sometimes proves to be necessary to separate the battery from the vehicle, for example to carry out maintenance operations. To this end, the vehicle is provided with an isolating circuit comprising selector switches capable of cutting off the direct current under full voltage, for example vacuum contactors. The isolating circuit is generally external to the battery and designed so that the state of isolation between the battery and the high voltage bus of the vehicle is visually controllable. The terminals of the battery are then accessible to operators. When the isolating circuit is integrated into the battery, it generally also comprises additional terminals that are intended for powering certain peripherals and therefore remain accessible to operators.

However, even when the isolating circuit opens the connection between the battery and the high voltage bus of the vehicle, the totality of the voltage of the battery remains applied to its terminals. Therefore, even at rest, during maintenance operations, the battery presents risks of electrocution for the operators.

Besides, water can infiltrate into the vehicle up to the batteries. The terminals can then be immersed in the water. The resulting exposure of water to the voltage at the battery terminals to the water induces risks of electrocution or hydrolysis of water, with a release of hydrogen and thus a risk of explosion. Owing to the requirement of cooling the battery, the battery cannot be housed as hermetically as would be required to overcome this risk.

Besides, the batteries generally must be put out of service as soon as possible when there is a failure of an accumulator. Indeed, the alternating voltage generated by the inverter depends on the direct voltage that the battery applies to it. As a consequence, a sudden drop in the voltage of the battery can induce problems of operation in the electric motor. The vehicle must then be immobilized and the battery insulated from the high voltage bus by means of the isolating circuit.

A prior-art solution for certain electrical/thermal hybrid vehicles resolves the problem of variation in voltage applied to the inverter in the event of failure of an accumulator. Such a solution comprises a converter between the battery and the inverter. The converter is a voltage step-up device when the battery powers the motor inverter, and a step-down device during the phases of recovering energy, when the motor inverter recharges the battery. Since such a converter works only very briefly in a hybrid vehicle, its size, the sizing of its cooling system and its cost can be minimized.

However, for a vehicle with purely electric drive, this converter has to work with a far higher cyclic ratio. This induces a size, a sizing of the cooling system, and a cost that cause handicaps.

SUMMARY

The invention seeks to resolve one or more of these drawbacks. The invention thus pertains to a battery element comprising:
- several electrochemical accumulators applying a difference in potential between first and second poles;
- two power output terminals;
- a securing device comprising first and second switches connected in series between the first and second poles, the first switch being a normally-closed switch and the second switch being a normally open switch, the normally open switch being configured to selectively isolate/connect the first pole and the first terminal, the normally-closed switch being configured to selectively isolate/connect the first and second terminals, the control signal of the normally-closed switch being a voltage applied by the electrochemical accumulators.

According to one variant, the element comprises a control circuit configured to simultaneously keep the normally-closed switch open and the normally open switch closed.

According to yet another variant, the normally open and normally-closed switches include MOSFET type transistors, the gate of the transistor of the normally-closed switch being connected to the voltage of one of the electrochemical accumulators that is greater than the voltage of the second pole and the source of the transistor of the normally-closed switch being connected to the second pole.

According to another variant, the gate of the MOSFET transistor of the normally-closed switch is connected to an electrochemical accumulator by means of a resistor, and the normally-closed switch including a switch controlled by the control circuit and connected between the gate of the MOSFET transistor of the normally-closed switch and the second pole.

According to yet another variant, the resistor connects the gate of the MOSFET transistor of the normally-closed switch, to a connection node between two of the series-connected accumulators.

According to one variant, the element comprises a fuse, the value $I^2t$ of which is lower than the value $I^2t$ of the internal links of the MOSFET transistor of the normally-closed switch.

According to another variant, the securing device comprises third and fourth switches connected in series between the first and second poles, the third switch being a normally-closed switch and the fourth switch being a normally open switch, the fourth switch being configured to selectively isolate/connect the first pole and the first terminal, the third switch being configured to selectively isolate/connect the first and second terminals, the control signal of the third switch being a voltage applied by the electrochemical accumulators.

According to yet another variant, the third and fourth switches include MOSFET type transistors, the gate of the third transistor being connected to the voltage of one of the electrochemical accumulators greater than the voltage of the second pole, and the source of the fourth transistor being connected to the second pole.

According to yet another variant of the invention, the closing of a same switch induces the opening of the transistors of the normally-closed switch.

According to one variant, the securing device comprises a circuit for detecting deterioration of one of the transistors of the normally-closed switches, the circuit for detecting comprising:
 a resistor connected between the first pole and a detection node;
 a first diode, the anode of which is connected to the detection node and the cathode of which is connected to the gate of the transistor of the first switch;
 a second diode, the anode of which is connected to the detection node and the cathode of which is connected to the gate of the third transistor;
 a circuit for measuring the voltage of the detection node.

The invention also pertains to a battery comprising several battery elements as described here above and connected in series, the sum of the nominal voltages of the battery elements being greater than 100V.

According to one variant, the control circuit is configured to simultaneously keep open the normally-closed switch of each battery element and keep closed the normally-open switch of each battery element.

According to yet another variant, the control circuit is configured to sequentially activate the application of the nominal voltage of several battery elements to their power output terminals.

According to another variant, the control circuit is configured to:
 detect the fact that a battery element has reached a charging limit;
 keep the normally-closed switch and the normally-open switch, respectively, of the detected battery element simultaneously closed and open;
 keep the normally-closed switch and the normally-open switch, respectively, of another battery element simultaneously open and closed.

The invention furthermore pertains to a motor vehicle comprising:
 an electric motor;
 a battery as described here above powering the electric motor.

DESCRIPTION OF THE DRAWINGS

Other characteristics and advantages of the invention shall appear more clearly from the following description given by way of an indication that in no way restricts the scope of the invention, with reference to the appended drawings, of which:

FIG. 10 illustrates a configuration of a connection of several securing devices during a pre-charging of a decoupling capacitor.

DETAILED DESCRIPTION

The invention proposes a secured battery element. The element comprises several electrochemical accumulators applying a difference in potential between the first and second poles, and two power output terminals.

The element also comprises a securing device provided with first and second switches connected in series between the first and second poles. The first switch is a normally-closed switch and the second switch is a normally-open switch. The normally-open switch is configured to selectively isolate/connect the first pole and the first terminal, and the normally-closed switch is configured to selectively isolate/connect the first and second terminals, the control signal of the normally-closed switch being a voltage applied by the electrochemical accumulators.

A normally-open switch forms a contact in the open state by default and a normally-closed switch forms a contact in the closed state by default. In particular, a normally-closed contact is a contact that is closed or in a conductive state when it, or the device operating it, is in a de-energized or relaxed state, whereas a normally-open contact is a contact that is open or in a non-conductive state when it, or the device operating it, is in a de-energized or relaxed state. An example of a normally open contact usage is the common household light switch.

The invention ensures the safety of an operator when the battery is not in use, for example when carrying out maintenance or recycling operations on the vehicle. The invention also makes it possible to prevent the creation of an electrical arc between the terminals of the battery or an element because of an error in handling during it during storage.

Figure 1:
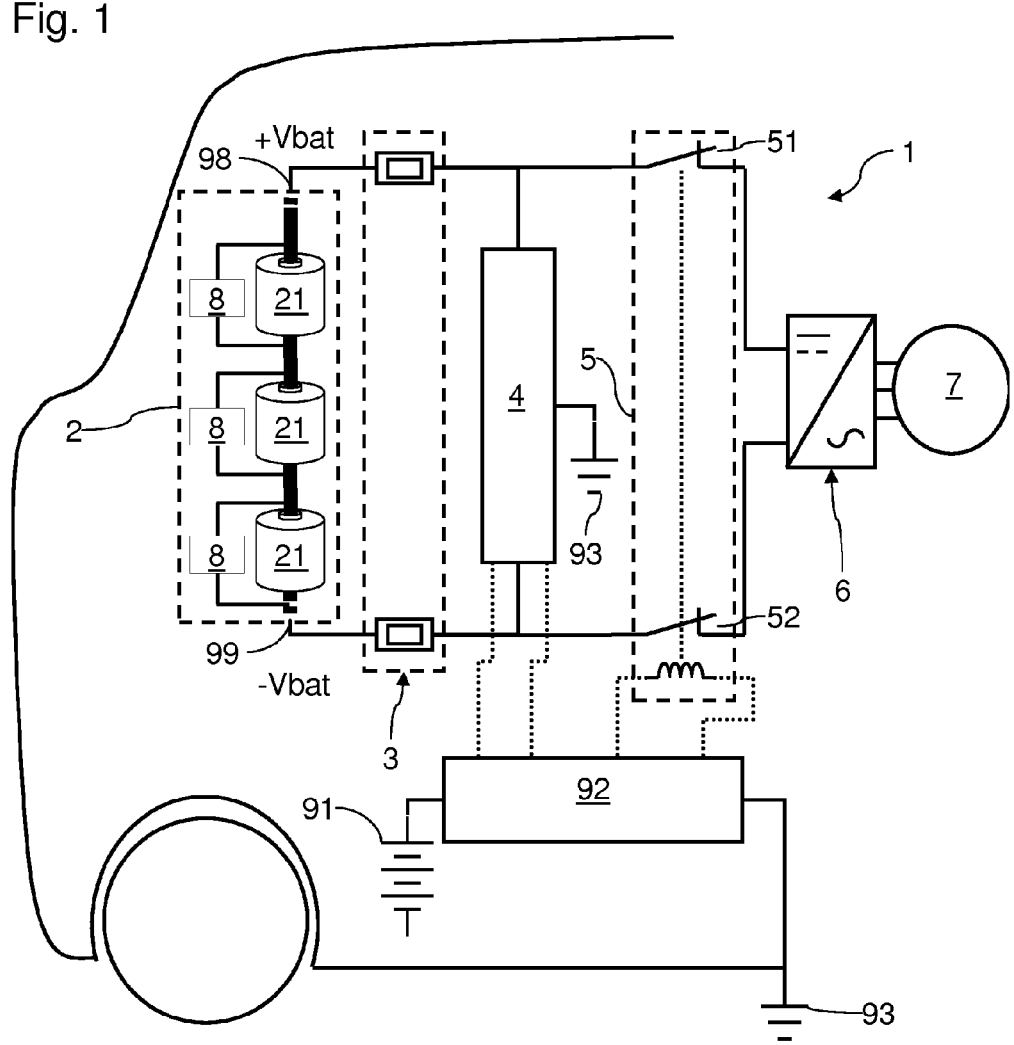
FIG. 1 is a schematic representation of a vehicle comprising a battery provided with a securing device according to the invention.

FIG. 1 illustrates an example of a vehicle 1 implementing an embodiment of the invention. The vehicle 1 is an electric vehicle comprising a battery 2 including modules or elements 21 containing series-connected electrochemical accumulators, for example of the lithium-ion iron phosphate (LiFePO4) type. The battery 2 thus comprises a plurality of stages of series-connected accumulators, each stage including several parallel-connected accumulators. The battery 2 comprises a large number of series-connected accumulators, typically between 40 and 150 accumulators depending on the voltage needed and on the type of accumulator used. The voltage at the terminals of the charged battery 2 is typically of the order of 400V. The battery 2 applies a voltage +Vbat to a first terminal 98 and a voltage −Vbat to a second terminal 99. The modules 21 are connected in series by means of electrical power connections. The terminals of the battery 2 are connected to a dc interface of an inverter 6. An electrical motor 7 is connected to an ac interface of the inverter 6.

The connection between the terminals of the battery 2 and the dc interface of the inverter 6 is obtained by means of a high voltage bus provided with a protection circuit 3 and by means of a power coupling circuit 5. The protection circuit 3 can include fuses configured to open the connection when there is a short circuit. The power coupling circuit 5 comprises switches 51 and 52 enabling the terminals of the battery 2 to be selectively connected to and disconnected from the dc interface of the inverter 6. The opening and closing of the switches 51 and 52 is controlled by a control circuit 92, which is typically a computer for monitoring the operation of the battery 2. The control circuit 92 is typically powered by means of an auxiliary battery 91 for powering the embedded network of the vehicle 1, having a voltage level far below that of the battery 2. The control circuit 92 is typically connected to the mechanical ground 93, which includes the metal frame and bodywork of the vehicle 1.

A device 4 for detecting an insulation fault is connected to the terminals of the battery 2 and to the mechanical ground 93. The device 4 for detecting comprises input terminals to which voltages +Vbat and −Vbat are respectively applied by means of the high voltage bus. The device 4 is configured to detect the appearance of an insulation fault between the battery 2 and the mechanical ground 93.

A module 21 corresponds to a manipulatable unit comprising several series-connected and/or parallel-connected accumulators 22. Each module 21 comprises a respective securing device 8. A module 21 can constitute one or more series-connected stages of the battery 2.

Figure 2:
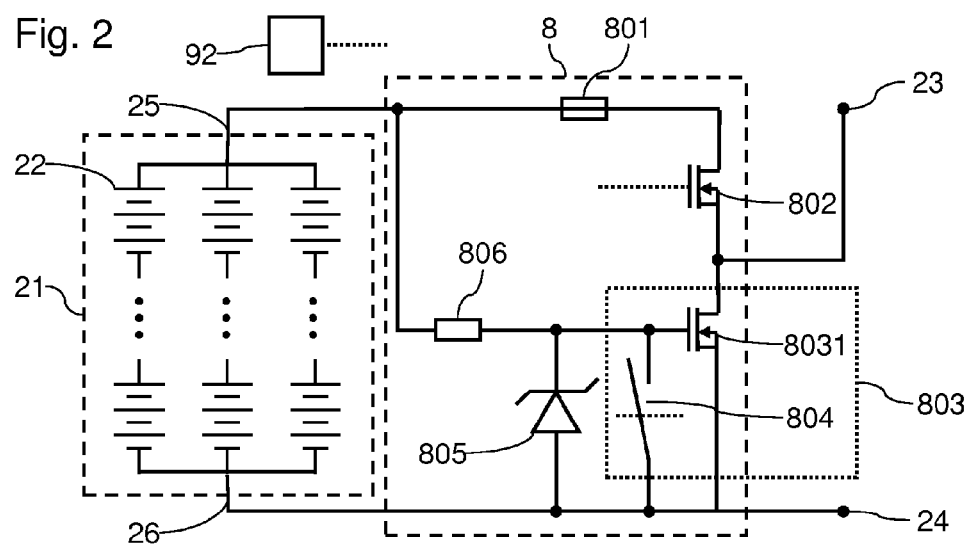
FIG. 2 is an electrical diagram of a securing device according to a first embodiment, attached to an element of the battery.

FIG. 2 is an electrical diagram of a first embodiment of a securing device 8 attached to a module 21 of the battery 2. The module 21 comprises several series-connected stages, each stage comprising several parallel-connected accumulators 22. The securing device 8 is connected to the module 21 by means of first and second poles 25 and 26 between which accumulators apply a difference in power potential. The module 21 also comprises first and second power output terminals 23 and 24 intended to be connected to modules in series or to one of the terminals 98 or 99 of the battery 2.

The securing device 8 comprises a first switch 803 and a second switch 802. The switches 802 and 803 are series-connected between the poles 25 and 26. The first switch 803 is configured to be normally closed; the second switch 802 being configured to be normally open. The second switch 802 is configured to selectively isolate/connect the pole 25 and the terminal 23. The first switch 803 is configured to selectively isolate/connect the terminal 23 and the terminal 24. The terminal 24 is connected to the pole 26. The closing of the second switch 802 is commanded by the control circuit 92.

When there is no control signal applied by the control signal 92, the second switch 802 is kept open. When there is no control signal applied by the control circuit 92, the first switch 803 is kept closed. Advantageously, the securing device 8 comprises a circuit breaker 801, for example implemented in the form of a fuse, that is connected between the pole 25 and the transistor 802.

In this case, the switch 802 is formed by the MOSFET transistor 802 and the switch 803 includes a transistor 8031 of a MOSFET type, these MOSFET transistors being capable of being easily sized appropriately at a relatively small cost. The transistors 802 and 8031 illustrated are N channel MOS type transistors. The source of the transistor 802 is connected to the terminal 803, its drain is connected to the pole 25 by means of the fuse 801, and its gate is connected to the control circuit 92. The source of the transistor 8031 is connected to the terminal 24, its drain is connected to the terminal 23, and its gate is connected to the pole 25 by means of a bias resistor 806. The opening of the transistor 8031 is controlled by a control circuit 92. To this end, the switch 803 includes a switch 804 connected between the gate of the transistor 8031 and the terminal 24. The command of the switch 804 forms the command of the normally-closed switch 803. The closing of the switch 804 lowers the potential of the gate of the transistor 8031 to the potential of the terminal 24, thus causing the transistor 8031 to go off. The opening of the switch 804 gives rise to a difference in potential between the gate of the transistor 8031 and the terminal 24, making the transistor 8031 on. The closing of the transistor 8031 is maintained, by default, by a voltage applied by the electrochemical accumulators 22. Thus, the normal presence of voltage between the poles 25 and 26 keeps the transistor 8031 closed when there is no command on the switch 804. Thus, the combination of the transistor 8031 and the switch 804 forms a normally-closed switch. Indeed, when there is no command from the switch 804, the default state of the switch 803 is that of being truly closed. The securing device 8 advantageously also comprises a Zener protection diode 805 connected between the gate of the transistor 8031 and the terminal 24. The Zener diode 805 proves to be particularly advantageous to regulate (for example, with a Zener voltage of the order of 15V) the voltage at the gate of the transistor 8031 when there is a major difference in potential across the terminals of the module 21.

Different modes of operation of the securing devices 8 are illustrated with reference to FIGS. 3 to 5. The battery 2 comprises three modules 211, 212 and 213 connected in series.

Figure 3:
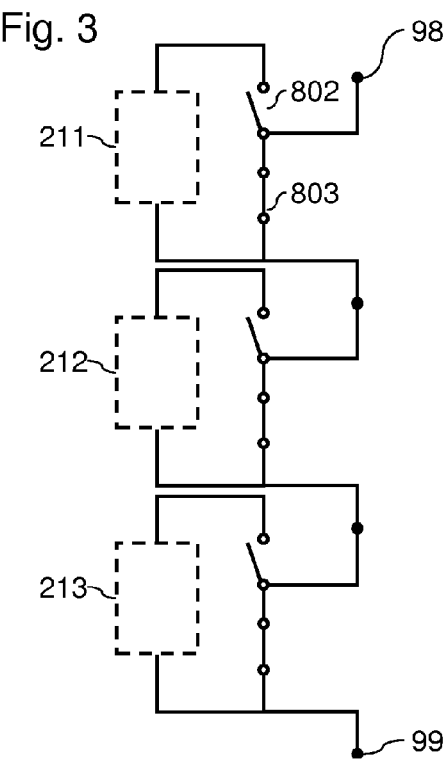
FIG. 3 illustrates the configuration of connection of the battery when the vehicle is at a stop.

In FIG. 3, the vehicle 1 has stopped or the battery 2 is being kept outside the vehicle. The control circuit 92 is then either disconnected from the battery 2 or configured so as to apply no control signal to the switches 802 and 804. Thus, the control circuit 92 is configured to simultaneously keep the switch 802 open and the switch 803 closed. In this configuration, the terminals of each of the modules 211 to 213 are connected to a same potential. Thus, the difference in potential between the terminals 98 and 99 of the battery is zero. The transistor 8031 behaves like a capacitor between gate and source and thus has appreciably zero electrical consumption.

Thus, the battery 2 has a stable state in which the voltage at its terminal 98 and 99 is zero, thus preventing any risk of electrocution for a worker. Similarly, the process of manufacturing the battery 2 is facilitated since the precautions to be taken by any person assembling it are reduced. Furthermore, the battery 2 automatically goes into a secured operating mode, for example during a failure of the control circuit 92, for example because of an immersion. This also prevents the accidental formation of an electrical arc between the terminals during the storage of the module. The opening of the switches 802 maintains the charging of the battery 2 in preventing the creation of a short circuit between the poles of a module.

Figure 4:
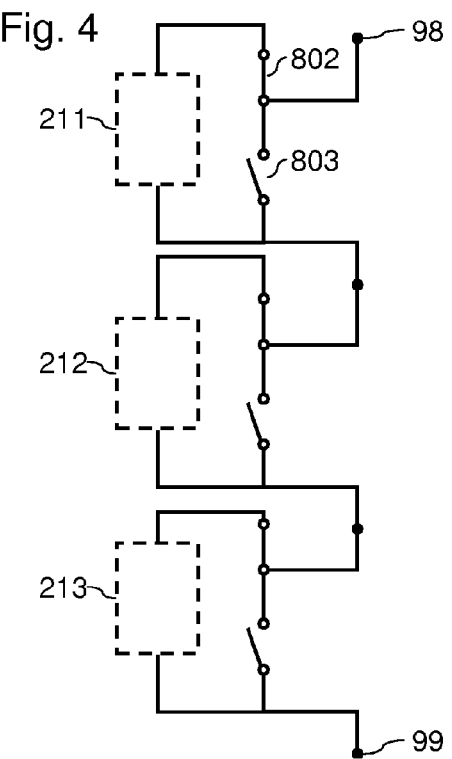
FIG. 4 illustrates the configuration of connection of the battery when the vehicle is in operation.

In FIG. 4, the vehicle 1 is in operation and the battery 2 powers the electric motor 7 of the vehicle.

In each module, the control circuit 92 keeps the switch 804 closed so that the transistor 8031 is off and the switch 803 is therefore open. The control circuit 92 simultaneously keeps the switch 802 on. The terminal 23 is thus connected to the pole 25 so that the difference in potential generated by the electrochemical accumulators 21 is applied between the terminals 23 and 24.

In this configuration, the modules 21 are series connected so that the totalized voltages of the modules 211 to 213 are applied between the output terminals 98 and 99. The inverter 6 can thus be powered at an appropriate voltage.

Figure 5:
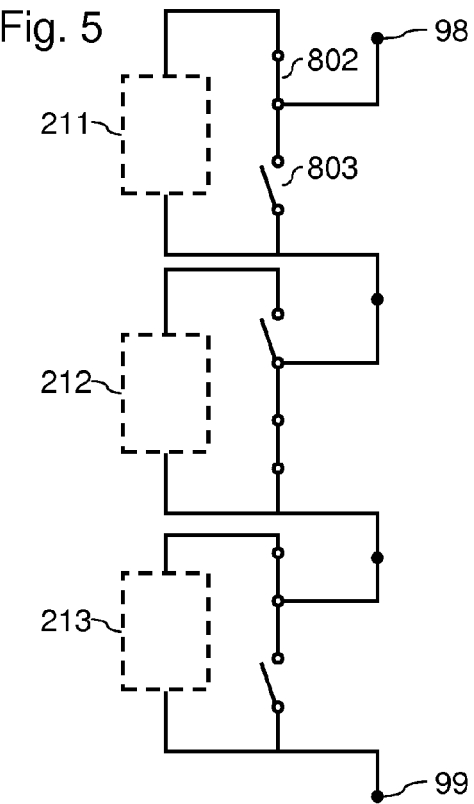
FIG. 5 illustrates the configuration of connection of the battery in an example of malfunctioning with action of a securing device.

In FIG. 5, the vehicle 1 is in operation and the module 212 is in a state of failure. When the module 212 goes into short circuit, as in the example, the switch 802 opens and the switch 803 closes. The terminals 23 and 24 are thus shorted. The series current of the battery 2 then passes through the switch 803 of the module 212 to enable a continuity of service. The modules 211 and 213 continue to work normally to make their contribution to the difference in potential between the terminals 98 and 99.

The switching over of the transistor 8031 into the "off" state is advantageously prior to the switching over of the transistor 802 into the "on" state so as to prevent a transient short-circuit between the pole 25 and the terminal 24. Thus, a short non-overlap duration proves to be advantageous. Similarly, the switching over of the transistor 802 into the "off" state is advantageously prior to the switching over of the transistor 8031 into the "on" state so as to prevent a transient short-circuit between the pole 25 and the terminal 24.

In order to limit the consumption of the securing device 8 during the working of the vehicle 1, the resistor 806 advantageously has a value that is high enough to obtain a current passing through it of the order of 1 microampere so as not to impair the autonomy of the battery 2. The value of this resistor could, for example, range from 1 to 10 MΩ.

The fuse 801 advantageously has a value $I^2t$ below the value of $I^2t$ of the internal links of the transistor 8031. Such a sizing of the fuse 801 ensures continuity of service of the battery 2 even when there is a failure of the transistor 802. Should the transistor 802 be accidentally shorted, the current passing through the transistor 802 induces the opening of the fuse 801, if possible before the deterioration of the transistor 8031 or else in accepting the fact that this transistor has deteriorated following an overheating of the semi-conductor, which takes it to a permanent conductive state (short-circuit). Thus, on the one hand, the pole 25 is isolated from the terminal 23 and, on the other hand, the terminal 23 can be kept at the potential of the terminal 24. Be that as it may, the fuse 801 averts a deterioration of the transistor 803 to the extent of placing it in an open circuit state.

Figure 6:
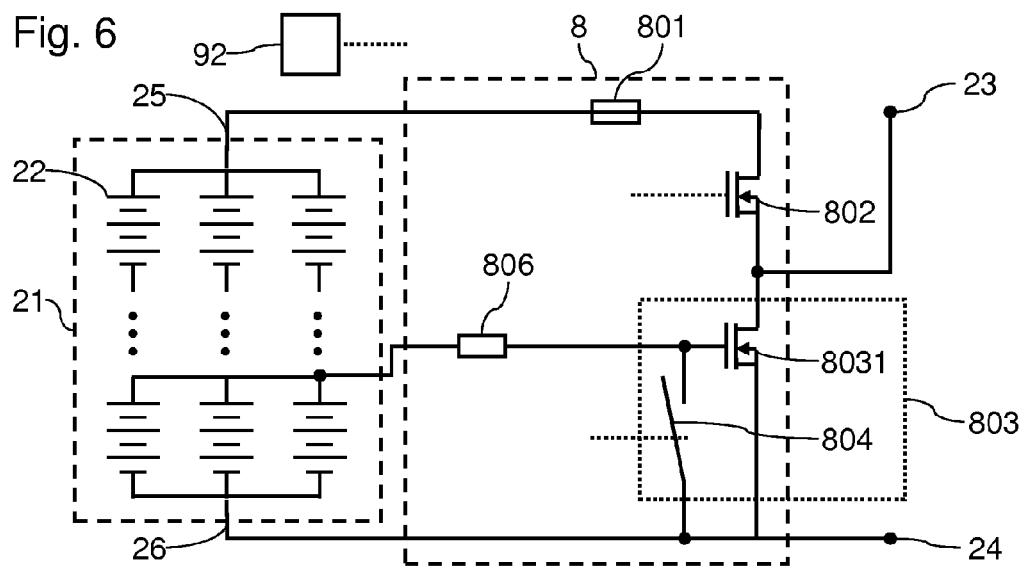
FIG. 6 is an electrical diagram of a securing device according to a second embodiment, attached to an element of the battery.

FIG. 6 is an electrical diagram of a securing device 8 according to a second embodiment attached to the module 21 of the battery 2. This embodiment provides a solution to the very low leakage current passing through the Zener diode 805 of the first embodiment during the periods of inactivity or storage. This second embodiment has no Zener diode connected between the gate of the transistor 8031 and the terminal 24. Besides, the resistor 806 is herein connected between the gate of the transistor 8031 and an intermediate point between the series-connected accumulators of the module 21. Thus, it is possible to apply a voltage to the gate of the transistor 8031 (below the voltage between the poles 25 and 26) compatible with the threshold voltage level of this gate, while at the same time keeping the transistor 8031 off.

Figure 7:
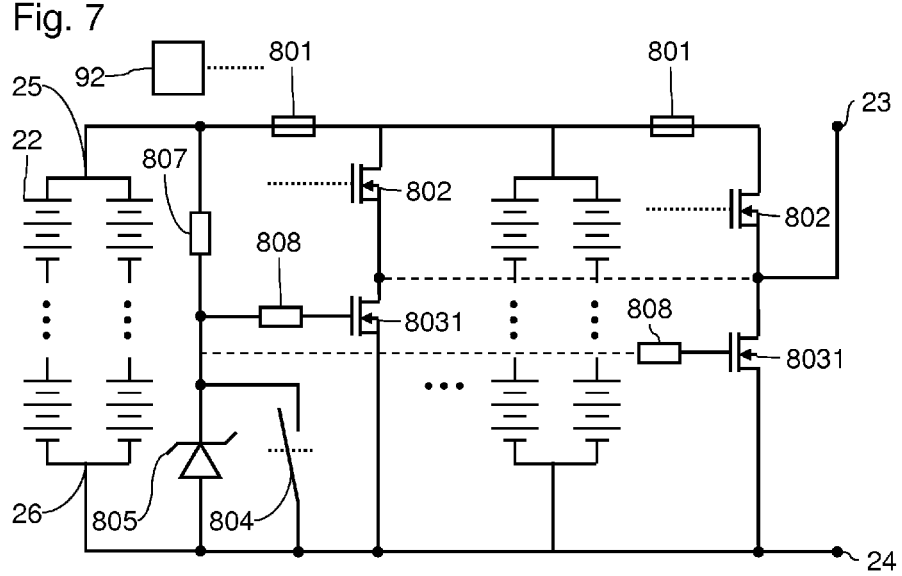
FIG. 7 is an electrical diagram of a securing device according to a first variant of a third embodiment of the invention.

FIG. 7 is an electrical diagram of a securing device according to a first variant of a third embodiment integrated into a module of the battery 2. The module comprises several parallel-connected arms (two in the example), each arm comprising several series-connected accumulators 22. Several groups of arms comprise respective securing devices. Each group of arms comprises a securing device made in the form of a local integrated circuit.

Each securing device comprises a fuse 801, a transistor 802, a transistor 8031 and a resistor 808. The fuse 801, the transistor 802 and the transistor 8031 are series connected between the terminal 24 and the pole 25 of the respective group of arms. The resistor 808 is connected between the gate of the transistor 803 and a node common to the different resistors 808. The source of the transistors 802 and the drain of the transistors 8031 are connected to the terminal 23.

The different securing devices share:
a common resistor 807 connected between the pole 25 and the node common to the resistors 808;
the switch 804 connected between the terminal 24 and the node common to the resistors 808;
the Zener diode 805 connected between the terminal 24 and the node common to the resistors 808.

In practice, this embodiment enables the distribution of the intensity let through by the module into several transistors 802. The release of heat by Joule effect is thus distributed and facilitates the cooling of the securing devices. It is thus possible to use transistors 802 with relatively usual sizing in furthermore benefiting from a redundancy for the conduction of the current of the module. Such a circuit can thus be made for a relatively limited cost while improving the continuity of service of the battery 2. The use of a switch 804 common to the different securing devices allows a simultaneous switching of all the transistors 8031 and comprehensively reduces the cost of the module. It is naturally also possible to use switches 804 dedicated to each of the securing devices.

Figure 8:
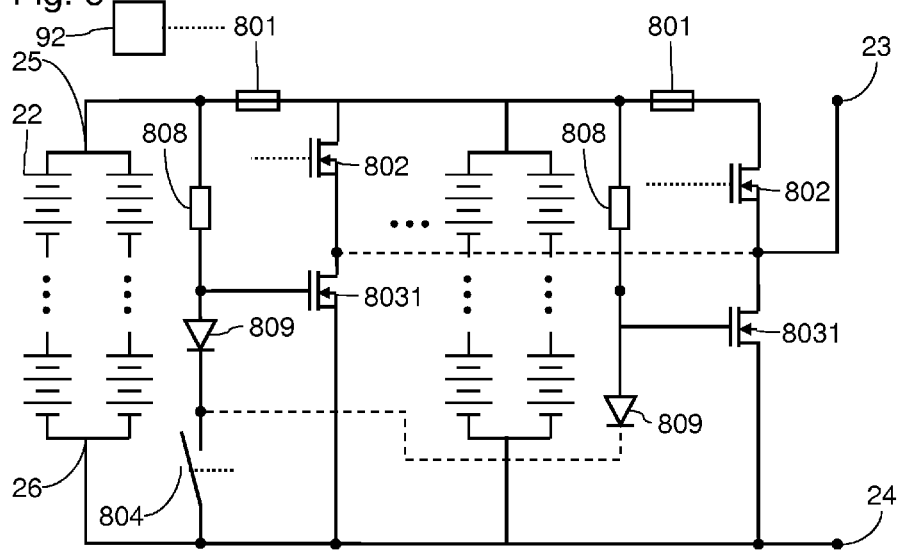
FIG. 8 is an electrical diagram of a securing device according to a second variant of a third embodiment.

FIG. 8 is an electrical diagram of a securing device according to a second variant of the third embodiment integrated into a module of the battery 2. The module comprises several parallel-connected arms (two in the example), each arm comprising several series-connected accumulators 22.

This second variant differs from the first variant in the use of a diode 809 for each of the securing devices. In each securing device, the diode 809 is connected between the switch 804 (node common to the different diodes 809) and the gate of the transistor 8031. Each securing device has a resistor 808 connected between a pole 25 and the gate of the transistor 8031. The diodes 809 can, for example, be of a bipolar type or of a Schottky type. The diodes 809 act as "OR" function diodes for turning off the transistors 8031 by means of the switch 804.

In the third embodiment, the module 21 comprises a large number of parallel-connected accumulators 22. For reasons of layout, a pair of transistors 802, 8031 is disposed at a respective group of parallel-connected arms. Such a configuration also favors the balancing of the currents between the different groups of arms. However, it is possible to envisage disposing all the pairs of transistors 802/8031 on a common electronic board.

Figure 9:
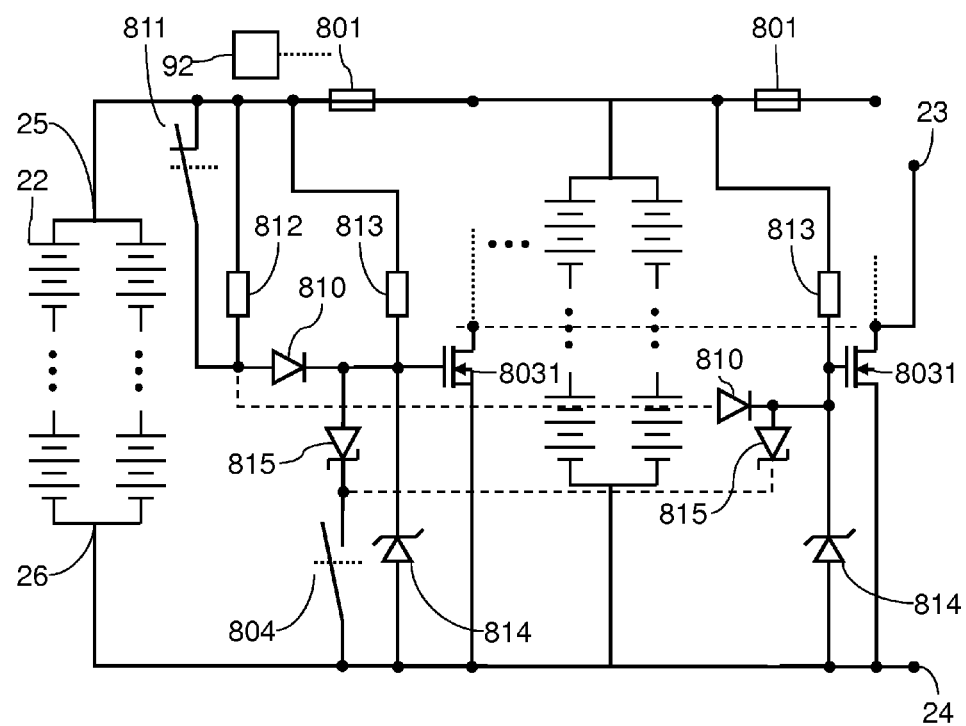
FIG. 9 is an electrical diagram of a fourth embodiment integrating a circuit for detecting failure.

FIG. 9 is an electric diagram of a fourth embodiment integrating a circuit for detecting failure. This embodiment also comprises securing devices integrated into respective groups of arms of accumulators.

Each securing device comprises a fuse 801, a normally-open transistor (not shown for reasons of readability), a transistor 8031, a resistor 813, a diode 810, a diode 815, and a Zener diode 814. The fuse 801, the normally-open transistor and the transistor 8031 are series-connected between the terminal 24 and the pole 25 of the respective group of arms. The resistor 813 is connected between the gate of the transistor 8031 and the pole 25. The sources of the transistors 802 and the drain of the transistors 8031 are connected to the terminal 23. The diode 810 is connected between the gate of the transistor 8031 and a node common to the other diodes 810. The diode 815 is connected to the gate of the transistor 8031 and to a node common to the other diodes 815. The Zener diode 814 is connected between the terminal 24 and the gate of the transistor 8031.

The different securing devices share:
the switch 804, connected between the terminal 24 and the node common to the diodes 815;
a resistor 812 connected between the pole 25 and the node common to the diodes 810;
a switch 811 connected between the pole 25 and the node common to the diodes 810 AND controlled by the control circuit 92.

The transistor 803 is turned off by means of the diode 815 (for example a Schottky diode) and a closing of the switch 804.

A detection of a failure of the transistors 8031 advantageously makes it possible also to turn on the transistors 8031 of the other securing devices and not to close the normally-open MOS transistors 802. The module is then used to transmit the current generated by the rest of the battery 2, the terminals 23 and 24 of the failed module being then shorted as described with reference to FIG. 5.

The diodes 810 and the resistor 812 fulfill an "AND" function. In order that the node common to the diodes 810 may pass to a low logic level, it is enough for any one of the gate voltages of the transistors 8031 to become appreciably zero. The destruction of a transistor 8031 is characterized by the deterioration of the gate oxide inducing a gate voltage passing appreciably to zero. The gate of the failed transistor 8031 then lets through the current of the respective resistor 813. The voltage at the node common to the diodes 810 is then appreciably zero. The control circuit 92 can then advantageously follow the level of voltage of the node common to the diodes 810 to determine whether one of the transistors 8031 is in failure.

To prevent deterioration of the autonomy of the module owing to the leakage resistors, the resistors 812 and 813 advantageously have appropriate values. The resistors 812 and 813 could, for example, have values ranging from 1 to 10 MΩ, to limit the leakage current to a value of the order of a few microamperes.

The diodes 810 can also advantageously be used to apply an increased current command (in closing the switch 811) and thus to increase the speed of closing of the transistor 8031.

To protect the diodes 815 in the event of failure of a transistor 8031 inducing a high gate voltage, a resistor is advantageously series-connected with a respective diode 815.

The securing devices 8 can be used to implement additional functions at the battery 2. The control circuit 92 can thus show an appropriate configuration to implement these different functions.

The control circuit 92 can then control the application of a voltage to the terminals of the battery 2 below the nominal voltage depending on the conditions of operation of the vehicle. In such a case, one or more modules could be shorted by closing their transistors 8031 and opening their transistors 802.

The invention advantageously also enables the use of the securing devices 8 to carry out a pre-charging of the decoupling capacitor of the inverter 6. Thus, it is possible to gradually apply the voltage of the battery 2 to the output terminals 98 and 99 by successively connecting the voltage of the different modules. The battery 2 thus applies voltage increments to the output terminals 98 and 99, these increments corresponding to the nominal voltage of a module. FIG. 10 illustrates the start of the pre-charging, only the voltage of the module 213 being applied between the output terminals 98 and 99.

The securing devices 8 can also be used during the charging of the battery 2 to isolate modules that have prematurely reached their nominal load from the charger.

Similarly, the securing devices 8 can be used at the end of the discharging the battery 2 in order to isolate a module from the inverter 6 when this module has prematurely reached the end of its discharging.

Advantageously, the module 21 can be varnished or coated with electrical insulator to limit the risks in the event of submersion. The varnish or the insulating coating can be applied to all the conductive surfaces remaining under voltage (accumulators 22 within the module 21) or to the integrated electronic circuit integrated with the module. This prevents malfunctions due to destruction of the electronic circuit or a generation of oxygen by electrolysis of water.

The invention claimed is:

1. An apparatus comprising a set having at least one battery element, wherein each battery element in said set comprises series-connected electrochemical accumulators applying a difference in potential between first and second poles, first and second power output terminals, and at least one securing device, wherein there is a securing device associated with each battery element, each said securing device comprises first and second switches connected in series between said first and second poles, said first switch being a normally-closed switch and said second switch being a normally-open switch, said normally-open second switch being configured to selectively isolate/connect said first pole and said first terminal, said normally-closed first switch being configured to selectively isolate/connect said first and second power output terminals, wherein said electrochemical accumulators are configured to apply, as a control signal for said normally-closed first switch, a voltage.

2. The apparatus of claim 1, further comprising a control circuit configured to simultaneously keep said normally-closed first switch open and said normally-open second switch closed.

3. The apparatus of claim 2, wherein said set comprises plural battery elements, said plural battery elements being connected in series, wherein a sum of nominal voltages of said plural battery elements exceeds one-hundred volts, wherein said control circuit is configured to simultaneously keep open said normally-closed first switch of each battery element and keep closed said normally-open second switch of each battery element.

4. The apparatus of claim 3, wherein said control circuit is configured to sequentially activate application of said nominal voltage of several battery elements to respective power output terminals thereof.

5. The apparatus of claim 3, wherein said control circuit is configured to detect that a particular battery element has reached a charging limit thereof, and to simultaneously keep said normally-closed first switch of said particular battery closed while simultaneously keeping said normally-open second switch of said particular battery element open, and keep said normally-closed first switch of another battery element open while simultaneously keeping said normally-open switch of said another battery element closed.

6. The apparatus of claim 1, wherein said normally-closed first switch comprises a first MOSFET transistor, and said normally-open second switch comprises a second MOSFET transistor, wherein a gate of said first MOSFET transistor, which is associated with said normally-closed first switch, is connected to a voltage of one of said electrochemical accumulators, said voltage of one of said electrochemical accumulators being greater that a voltage at said second pole, and wherein said source of said first MOSFET transistor, which is associated with said normally-closed first switch, is connected to said second pole.

7. The apparatus of claim 6, further comprising a fuse, said fuse having an $I^2t$ value that is lower than an $I^2t$ value of internal links of said first MOSFET transistor, which is associated with said normally-closed first switch.

8. The apparatus of claim 6, further comprising a control circuit configured to simultaneously keep said normally-closed first switch open and said normally-open second switch closed, and a resistor disposed to connect an electrochemical accumulator to said gate of said first MOSFET transistor, wherein said normally-closed first switch comprises a switch controlled by said control circuit and connected between said gate of said first MOSFET transistor of said normally closed switch and said second pole.

9. The apparatus of claim 8, wherein said switch controlled by said control circuit, when closed, induces opening of first MOSFET transistor of said normally-closed first switch.

10. The apparatus of claim 8, wherein said resistor connects said gate of said first MOSFET transistor, which is associated with said normally-closed first switch, to a connection node between two of said series-connected accumulators.

11. The apparatus of claim 1, wherein said at least one securing device further comprises a normally-closed third switch and a normally-open fourth switch connected in series between said first and second poles, wherein said normally-open fourth switch is configured to selectively isolate/connect said first pole and said first power output terminal, wherein said normally-closed third switch is configured to selectively isolate/connect said first and second power output terminals, and wherein said electrochemical accumulators are configured to apply, as a control signal for said normally-closed third switch, a voltage.

12. The apparatus of claim 11, wherein said third switch comprises a third MOSFET Transistor, wherein said fourth switch comprises a fourth MOSFET transistor, wherein a gate of said third MOSFET transistor is connected to a voltage of one of said electrochemical accumulators that is greater than a voltage at said second pole, and wherein a source of said fourth MOSFET transistor is connected to said second pole.

13. The apparatus of claim 12, wherein said at least one securing device comprises a circuit for detecting deterioration of said MOSFET transistors of said normally closed switches, said circuit for detecting deterioration comprising a resistor connected between said first pole and a detection node, a first diode, an anode of which is connected to said detection node and a cathode of which is connected to said gate of said MOSFET transistor of said normally-closed first switch, a second diode, an anode of which is connected to said detection node and a cathode of which is connected to said gate of said third MOSFET transistor, and a circuit for measuring said voltage of said detection node.

14. The apparatus of claim 1, wherein said set comprises plural battery elements, said plural battery elements being connected in series, wherein a sum of nominal voltages of said plural battery elements exceeds one-hundred volts.

15. The apparatus of claim 1, further comprising a motor-vehicle and an electric motor configured to move said motor-vehicle, wherein said set having at least one battery elements is configured to provide electric power to said electric motor.

16. An apparatus comprising a set having at least two battery elements, wherein each battery element in said set comprises series-connected electrochemical accumulators applying a difference in potential between first and second poles, first and second power output terminals, and at least two securing devices, wherein there is a securing device associated with each battery element, each said securing device comprises first and second switches connected in series between said first and second poles, said first switch being a normally-closed switch and said second switch being a normally-open switch, said normally-open second switch being configured to selectively isolate/connect said first pole and said first terminal, said normally-closed first switch being configured to selectively isolate/connect said first and second power output terminals, wherein said electrochemical accumulators are configured to apply, as a control signal for said normally-closed first switch, a voltage.

* * * * *